(12) United States Patent
Sato et al.

(10) Patent No.: US 6,664,957 B1
(45) Date of Patent: Dec. 16, 2003

(54) APPARATUS AND METHOD FOR THREE-DIMENSIONAL GRAPHICS DRAWING THROUGH OCCLUSION CULLING

(75) Inventors: Yuichi Sato, Kanagawa (JP); Mitsunori Hirata, Kanagawa (JP); Yosuke Senta, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/434,938

(22) Filed: Nov. 5, 1999

(30) Foreign Application Priority Data

Mar. 17, 1999 (JP) .......................................... 11-072498

(51) Int. Cl.⁷ .............................................. G06T 17/00
(52) U.S. Cl. ...................................... 345/420; 345/421
(58) Field of Search ................................ 345/419–422, 345/428, 589

(56) References Cited

U.S. PATENT DOCUMENTS

| | | |
|---|---|---|
| 5,245,700 A | 9/1993 | Fossum |
| 5,542,025 A | 7/1996 | Brown |
| 5,557,711 A | 9/1996 | Malzbender |
| 5,561,750 A | 10/1996 | Lentz |
| 5,583,974 A | 12/1996 | Winner et al. |
| 5,590,249 A | 12/1996 | Hanaoka |
| 5,613,050 A | 3/1997 | Hochmuth et al. |
| 5,751,291 A | 5/1998 | Olsen et al. |
| 5,856,829 A | 1/1999 | Gray et al. |
| 5,956,028 A | 9/1999 | Matsui et al. |
| 5,999,187 A * | 12/1999 | Dehmlow et al. ........... 345/420 |
| 6,094,200 A * | 7/2000 | Olsen et al. ................ 345/422 |
| 6,130,670 A * | 10/2000 | Porter ........................ 345/421 |
| 6,226,003 B1 * | 5/2001 | Akeley ....................... 345/419 |

FOREIGN PATENT DOCUMENTS

| | | |
|---|---|---|
| JP | 8-1667 | 1/1996 |
| JP | 9-134446 | 5/1997 |
| JP | 10-79044 | 3/1998 |

OTHER PUBLICATIONS

Marsan, Anne L., "Computational Techniques for Automatically Tiling and Skinning Branched Objects", *Computers & Graphics*, Pergamon Press Ltd. Oxford, GB, vol. 23, No. 1, Feb. 1999, pp. 111–126.

Michael Garland, et al., "Surface Simplification Using Quadric Error Metrics," Computer Graphics Proceedings, Annual Conference Series, 1997.

Law F–A, et al: Computational Techniques for automatically tiling and Skinning Branched Objects Computer and Graphics, Pergamon Press Ltd. Oxford, GB, vol. 23, No. 1, Feb. 1999, pp. 111–126.

Bittner et al: "Hierarchical Visibility Culling with Occlusion Trees" Computer Graphics International, 1998, Proceedings Hannover, Germany Jun. 22–26, 1998, Los Alamitos, CA, USA, IEEE Comput. Soc, US, Jun. 22, 1998, pp. 207–219.

Hanson Zhang: "Effective Occlusion Culling for the Interactive Display of Arbitrary Models" 1998, Dissertation Submitted to the Faculty of the University of North Carolina, Chapel Hill.

Law F–A, et al: "Preprocessing Occlusion For Real–Time Selective Refinement" Proceedings of the 1999 Symposium on Interactive 3D Graphics. Atlanta, GA., Apr. 26–28, 1999, Proceedings of the Symposium on Interactive 3D Graphics, New York, NY.

Japanese Patent Office first Office Action for corresponding Japanese Application.

* cited by examiner

*Primary Examiner*—Matthew Luu
(74) *Attorney, Agent, or Firm*—Staas & Halsey LLP (57) ABSTRACT

Each object is assigned a different piece of virtual color information, and an object is drawn on a bit map using the virtual color. By scanning the virtual color in the bit map, it is determined whether or not an object is occluded by another object.

12 Claims, 12 Drawing Sheets

APPARATUS AND METHOD FOR THREE-DIMENSIONAL GRAPHICS DRAWING THROUGH OCCLUSION CULLING

BACKGROUND OF THE INVENTION

1. Field of the Invention

The present invention relates to an apparatus and a method for drawing a three-dimensional graphics model generated by a computer.

2. Description of the Related Art

Recently, three-dimensional computer graphics (3DCG) are widely used in a mechanical CAD (computer-aided design) system, a virtual reality simulation system such as a graphics game, animation, walk-through, etc., and many other fields.

An occlusion culling method has been well-known as one of the conventional methods for drawing 3DCG at a high speed (U.S. Pat. No. 5,751,291 May/1998 Olsen et al., U.S. Pat. No. 5,613,050 March/1997 Hochmuth et al.). In this method, a CG model (object) of a thing to be drawn is covered with a basic figure such as a rectangular parallelepiped, etc. Using the basic figure for the object, it is determined whether or not the basic figure has been occluded by another basic figure.

To be occluded by another figure means that a figure is hidden by the other figure. A drawing operation can be performed at a higher speed by omitting to draw an object in an occluded basic figure.

However, the above described occlusion culling method has the following problem.

When an object having a complicated shape is to be drawn in this method in which an object is covered with a basic figure such as a rectangular parallelepiped, etc., it is not rare to overlook a state in which one object is hidden by another, to omit an object not hidden by another. Therefore, this method is suitable for a system such as a walk-through system, etc. for processing an object having a relatively simple shape.

However, on a mechanical designing field, there can be a complicated-shaped object made of several hundred thousand polygons. In such a case, a correct drawing cannot be expected in the occlusion culling method using basic figures. Therefore, an occlusion culling method capable of drawing a 3D model made of a large number of polygons at a high speed, improving the update rate of a computer screen, and smoothly rotating and moving the model is strongly demanded.

SUMMARY OF THE INVENTION

The present invention aims at providing a drawing apparatus and a drawing method for performing a correct and rapid occlusion culling process in a CG system which processes a complicated shape such as a mechanical CAD.

According to the first aspect of the present invention, the drawing apparatus includes a shape information storage unit, a table unit, a virtual image storage unit, a discrimination unit, and an occlusion culling unit, and displays a plurality of objects.

The shape information storage unit stores shape information about the plurality of objects. The table unit stores plural pieces of color information one-to-one virtually corresponding to the plurality of objects. The virtual image storage unit stores virtual color image information drawn based on the information in the shape information storage unit and the table unit. The discrimination unit discriminates the occlusion of an object by scanning the virtual color image information. The occlusion culling unit omits to display an object discriminated as being occluded among the plurality of objects.

According to the second aspect of the present invention, the drawing apparatus includes a shape information storage unit, a table unit, a virtual image storage unit, a discrimination unit, and an occlusion culling unit, and displays a plurality of objects.

The shape information storage unit stores shape information about the plurality of objects. The table unit stores plural pieces of identification information one-to-one virtually corresponding to the plurality of objects. The virtual image storage unit stores virtual image information in which each object is drawn with corresponding identification information based on information in the shape information storage unit and the table unit. The discrimination unit discriminates the occlusion of an object by scanning the virtual image information. The occlusion culling unit omits to display an object determined as being occluded among the plurality of objects.

According to the third aspect of the present invention, the drawing apparatus includes a discrimination unit, a reduction unit, and a display unit, and displays a plurality of objects.

The reduction unit reduces the number of geometry primitives forming the plurality of objects. The discrimination unit discriminates the occlusion of an object using objects whose number of geometry primitives is reduced. The display unit displays an object discriminated as not being occluded among the plurality of objects using geometry primitives larger in number than the geometry primitives used in occlusion discrimination.

DESCRIPTION OF THE PREFERRED EMBODIMENTS

An embodiment of the present invention is described below in detail by referring to the attached drawings.

Figure 1:
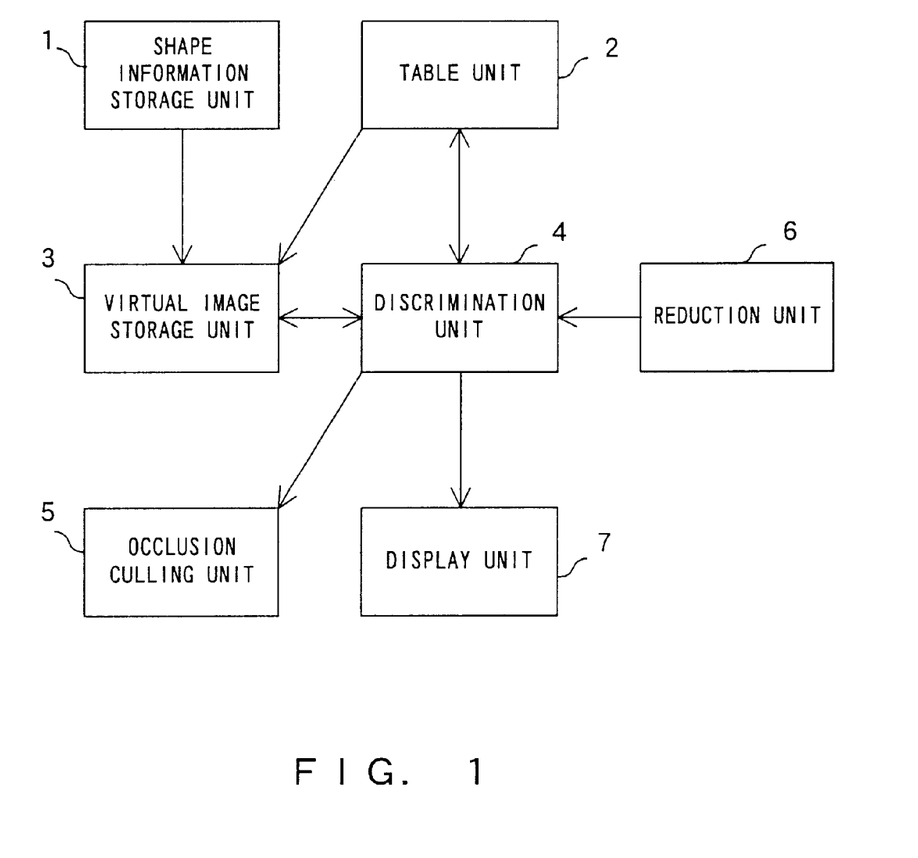
FIG. 1 shows the principle of the drawing apparatus according to the present invention.

FIG. 1 shows the principle of the drawing apparatus according to the present invention. According to the first principle of the present invention, the drawing apparatus comprises a shape information storage unit 1, a table unit 2, a virtual image storage unit 3, a discrimination unit 4, and an occlusion culling unit 5, and displays a plurality of objects.

The shape information storage unit 1 stores shape information about the plurality of objects. The table unit 2 stores plural pieces of color information one-to-one virtually corresponding to the plurality of objects. The virtual image storage unit 3 stores the virtual color image information drawn baced on the information in the shape information storage unit 1 and the table unit 2. The discrimination unit 4 discriminates the occlusion of an object by scanning the virtual color image information. The occlusion culling unit 5 omits to display an object discriminated as being occluded among the plurality of objects.

The table unit 2 stores the one-to-one correspondence between the identification information of an object and color information. The color information virtually corresponding to an object is not the color information for actual display of the object, but the color information for virtually drawing the object for occlusion determination. The virtual color image information drawn according to the virtual color image information is not actually displayed on the screen.

The discrimination unit 4 extracts the color information by scanning in pixel units the virtual color image information stored in the virtual image storage unit 3, refers to the table unit 2, and identifies objects corresponding to the extracted color information. Then, it discriminates the objects as not being occluded, and the other objects as being occluded. The occlusion culling unit 5 determines that objects discriminated as being occluded are not to be displayed.

The feature of the first principle of the present invention is to generate image information according to color information uniquely assigned to each object, and discriminate the occlusion of an object according to the image information.

Since the shape of an object, not a basic figure covering the object, is used in the above described drawing apparatus, stricter occlusion discrimination can be made. In addition, the discrimination can be made at a high speed by scanning the image information drawn according to the color information uniquely assigned to each object.

According to the second principle of the present invention, the drawing apparatus comprises the discrimination unit 4, a reduction unit 6, and a display unit 7, and displays a plurality of objects.

The reduction unit 6 reduces the number of geometry primitives forming the plurality of objects. The discrimination unit 4 discriminates the occlusion of an object using objects whose number of geometry primitives is reduced. The display unit 7 displays the objects discriminated as not being occluded among the plurality of objects using geometry primitives larger in number than the geometry primitives used in the occlusion discrimination.

The geometry primitives are geometric data expressing a part of the surface of an object. For example, they can be triangular polygons. The reduction unit 6 generates for each object a model whose number of geometry primitives has been reduced. The discrimination unit 4 discriminates the occlusion of an object using models generated by the reduction unit 6. The display unit 7 displays the objects discriminated as not being occluded using, for example, the geometry primitives before reduction.

The feature of the second principle of the present invention is that the occlusion discrimination is conducted with the number of geometry primitives of each object reduced.

With the drawing apparatus, the shape of an object can be simplified with the number of geometry primitives reduced. Therefore, the occlusion discrimination can be performed at a high speed. In addition, since the shape of a model whose number of geometry primitives has been reduced reflects the shape of the original object, strict discrimination can be made.

For example, the shape information storage unit 1, the table unit 2, and the virtual image storage unit 3 shown in FIG. 1 correspond to a RAM (random access memory) 27 described later and shown in FIG. 3. The discrimination unit 4, the occlusion culling unit 5, and the reduction unit 6 shown in FIG. 1 correspond to a CPU (central processing unit) 23 shown in FIG. 3. The display unit 7 shown in FIG. 1 corresponds to the graphics processing device 25 and the graphic display 26 shown in FIG. 3.

According to the present embodiment, each object is assigned virtual color information different from that assigned to other objects to determine whether or not an object is occluded by another object. Using the assigned color, the object is drawn on a bit map. Then, by scanning colors on the bit map, it is determined whether or not an object is occluded by another object.

Since the shape of an object, not a basic figure covering the object, is used in the above described occlusion discrimination, strict discrimination can be made. In addition, the discrimination can be performed at a high speed by scanning the color uniquely assigned to each object on the bit map.

The occlusion culling process can be more efficiently performed by drawing an object according to virtual color information once for several frames. In addition, the occlusion culling process can be performed at a higher speed by using a model obtained after the polygon reduction as a model for drawing the virtual color information.

Figure 2:
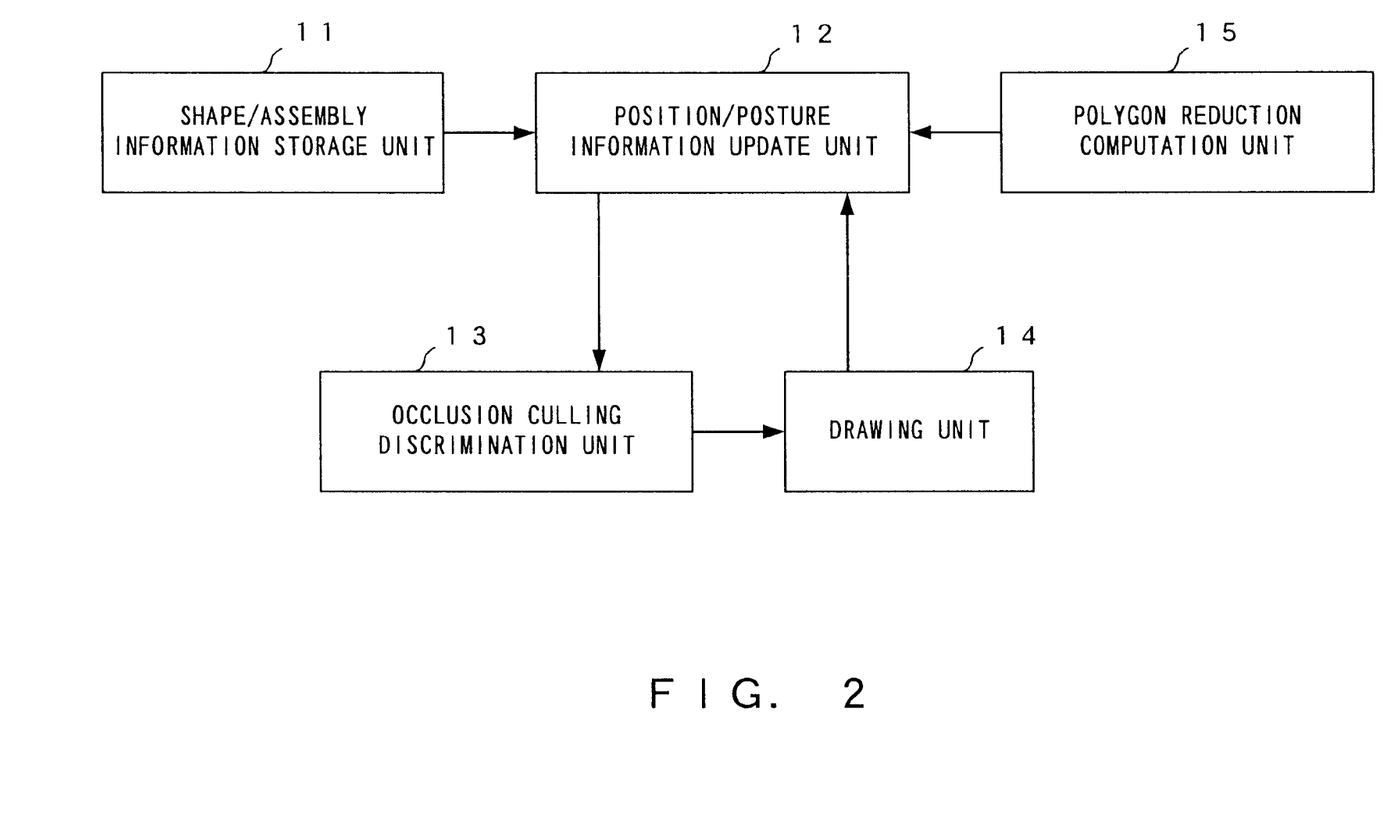
FIG. 2 shows the configuration of the drawing apparatus.

FIG. 2 shows the configuration of the drawing apparatus for drawing at a high speed an assembly model generated by a mechanical CAD, etc. The drawing apparatus shown in FIG. 2 comprises a shape/assembly information storage unit 11, a position/posture information update unit 12, an occlusion culling discrimination unit 13, a drawing unit 14, and a polygon reduction computation unit 15.

The shape/assembly information storage unit 11 stores figure information such as a set of vertexes representing an object, parent-child relation representing assembly relation among objects, position, posture, joint relation, etc. The position/posture information update unit 12 computes the amount of variance to the time of the position of each vertex representing the position and posture of an object when the object moves.

The occlusion culling discrimination unit 13 draws each object according to virtual color information, sets the result on a bit map, and detects the colors appearing on the bit map. Thus, an object appearing as not covered with another object (an object which is not occluded) can be extracted and marked.

The drawing unit 14 draws on several cycles only the objects marked by the occlusion culling discrimination unit 13. The polygon reduction computation unit 15 stepwise reduces the number of polygons of objects, and enters the number of polygons in the position/posture information update unit 12. These objects are used to speed up the discrimination of occlusion culling process.

Figure 3:
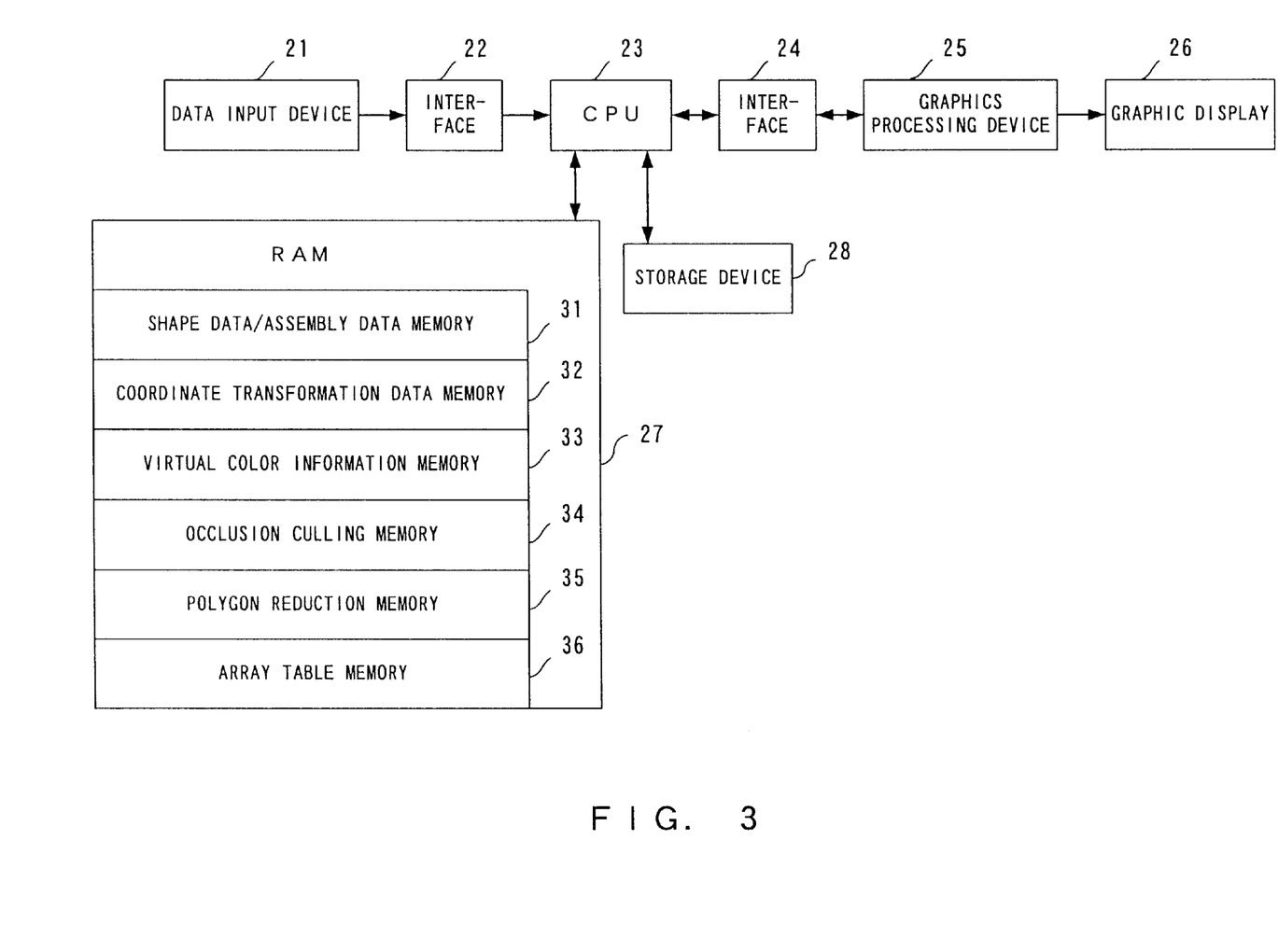
FIG. 3 shows the configuration of the information processing unit.

FIG. 3 shows an example of the configuration of the drawing apparatus using an information processing device (computer). The information processing device shown in FIG. 3 comprises a data input device 21, interfaces (I/F) 22 and 24, a CPU (central processing unit) 23, a graphics processing device 25, a graphic display 26, RAM (random-access memory) 27, and a storage device 28.

The CPU 23 performs operations for the update of positions and posture (coordinate transformation) performed when an object is moved, the occlusion culling, the polygon reduction, and the display of computation results, the operations for graphically displaying the movement of the object, and all other logical operations. The process of updating the position and posture of the object in a space can be regarded as a process of transforming the coordinate system of the object into another coordinate system. Therefore, the process is often referred to as the coordinate transformation of an object.

The storage device 28 stores necessary data and execution modules such as a work environment, the shape data of an object, assembly data, their initial positions, an execution module (program) of a drawing algorithm, an execution module for graphically displaying an object, etc. The storage device 28 can be, for example, a magnetic disk device, an optical disk device, a magneto-optical disk device, etc.

The RAM 27 comprises shape data/assembly data memory 31, coordinate transformation data memory 32, virtual color information memory 33, occlusion culling memory 34, a polygon reduction memory 35, an array table memory 36.

The shape data/assembly data memory 31 holds data of the work environment and object called by the CPU 23 through the storage device 28. The coordinate transformation data memory 32 holds the shape data of an object computed by the CPU 23 using the move instruction data of the object input through the data input device 21.

The virtual color information memory 33 holds on a bit map the drawing result when a different virtual color is allotted to each object for an occlusion culling process. The occlusion culling memory 34 holds a flag indicating that the object having the color as drawn on the bit map in the virtual color information memory 33 is positioned in front, not occluded by any object.

A model whose number of polygons of each object has been reduced is resident in the polygon reduction memory 35. An object in a CG system is normally formed by a set of geometry primitives such as triangular polygons.

A model in the polygon reduction memory 35 contains figure information such as the true color of each geometry primitive forming an object, vertex coordinates, a normal vector, etc. The data of the highest level in the polygon reduction is the geometry primitive data of the original object while the data of a low level is stepwise generated from the original geometry primitives.

The array table memory 36 holds the one-to-one correspondence between the identification information and the virtual color of an object. By referring to the array table memory 36, a virtual color corresponding to each object can be obtained, or the identification information of an object corresponding to each virtual color can be obtained.

The data input device 21 transmits the work environment, the position and posture of an object contained in an assembly model, move instruction data, etc. to the CPU 23 through the interface 22. The CPU 23 processes of updating the position and posture of each object, polygon reduction, occlusion culling, etc. while accessing the RAM 27 and the storage device 28.

The graphics processing device 25 can be, for example, a graphics board, and comprises a plurality of frame buffers temporarily accumulating image information, and a swapping mechanism for swapping the frame buffers to transmit the image information to the graphic display 26.

When an occlusion culling process is performed, the image information only about objects positioned in front is expanded in the frame buffer according to the information in the occlusion culling memory 34 and the polygon reduction memory 35 transmitted through the interface 24. Then, the image information is transmitted to the graphic display 26 by the swapping mechanism, and displayed on the screen.

The shape/assembly information storage unit 11 shown in FIG. 2 corresponds to the storage device 28 shown in FIG. 3, and the drawing unit 14 shown in FIG. 2 corresponds to the graphics processing device 25 and the graphic display 26 shown in FIG. 3. In addition, the position/posture information update unit 12, the occlusion culling discrimination unit 13, and the polygon reduction computation unit 15 shown in FIG. 2 correspond to the execution modules stored in the storage device 28 shown in FIG. 3.

Figure 4:
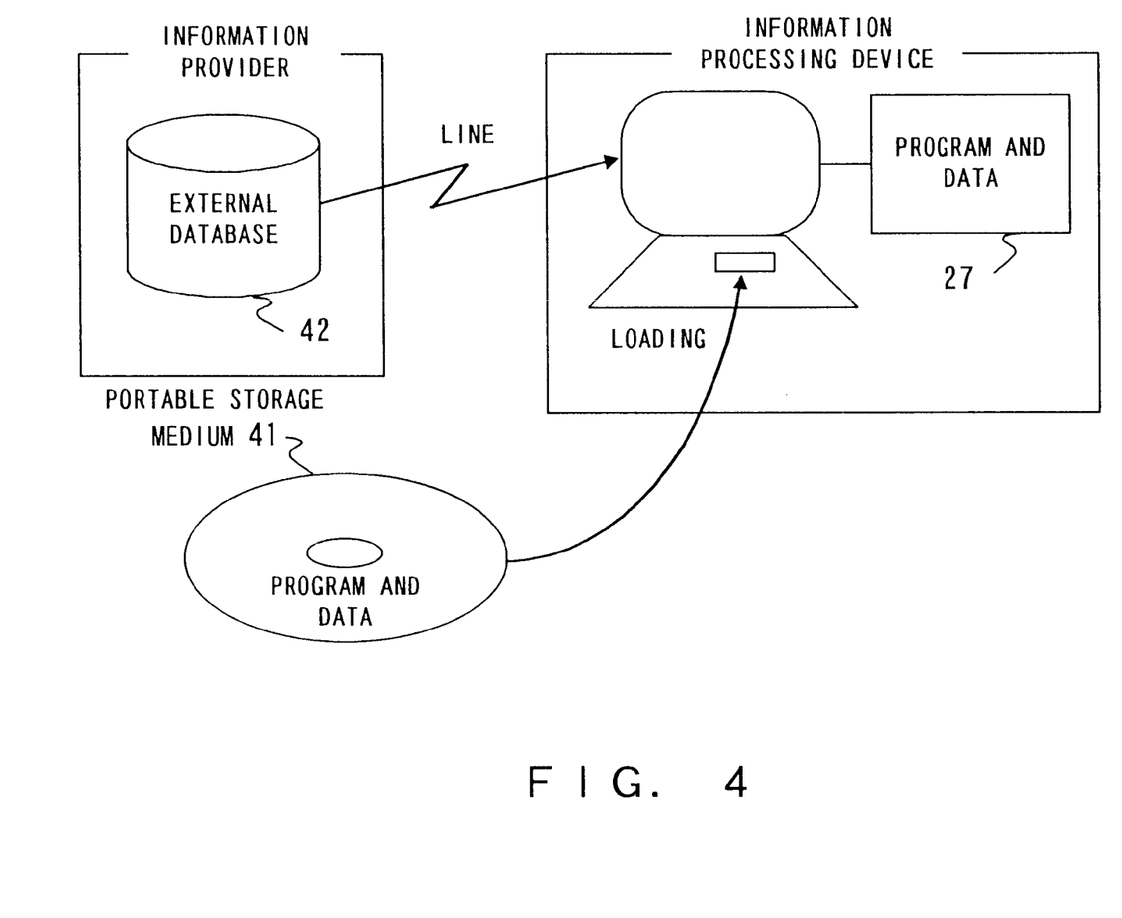
FIG. 4 shows storage media.

FIG. 4 shows a computer-readable storage media capable of providing a program and data for the information processing device shown in FIG. 3. When the program and data required for a process are stored in a portable storage medium 41, the information is first loaded onto the RAM 27, and is then used by the CPU 23. The portable storage medium 41 can be any computer-readable storage medium such as a memory card, floppy disk, CD-ROM (compact disk read only memory), an optical disk, a magneto-optical disk, etc.

In addition, when the program and data required for a process are stored in an external database 42, the information is first loaded onto the RAM 27 through a line, and is then used by the CPU 23.

Figure 5:
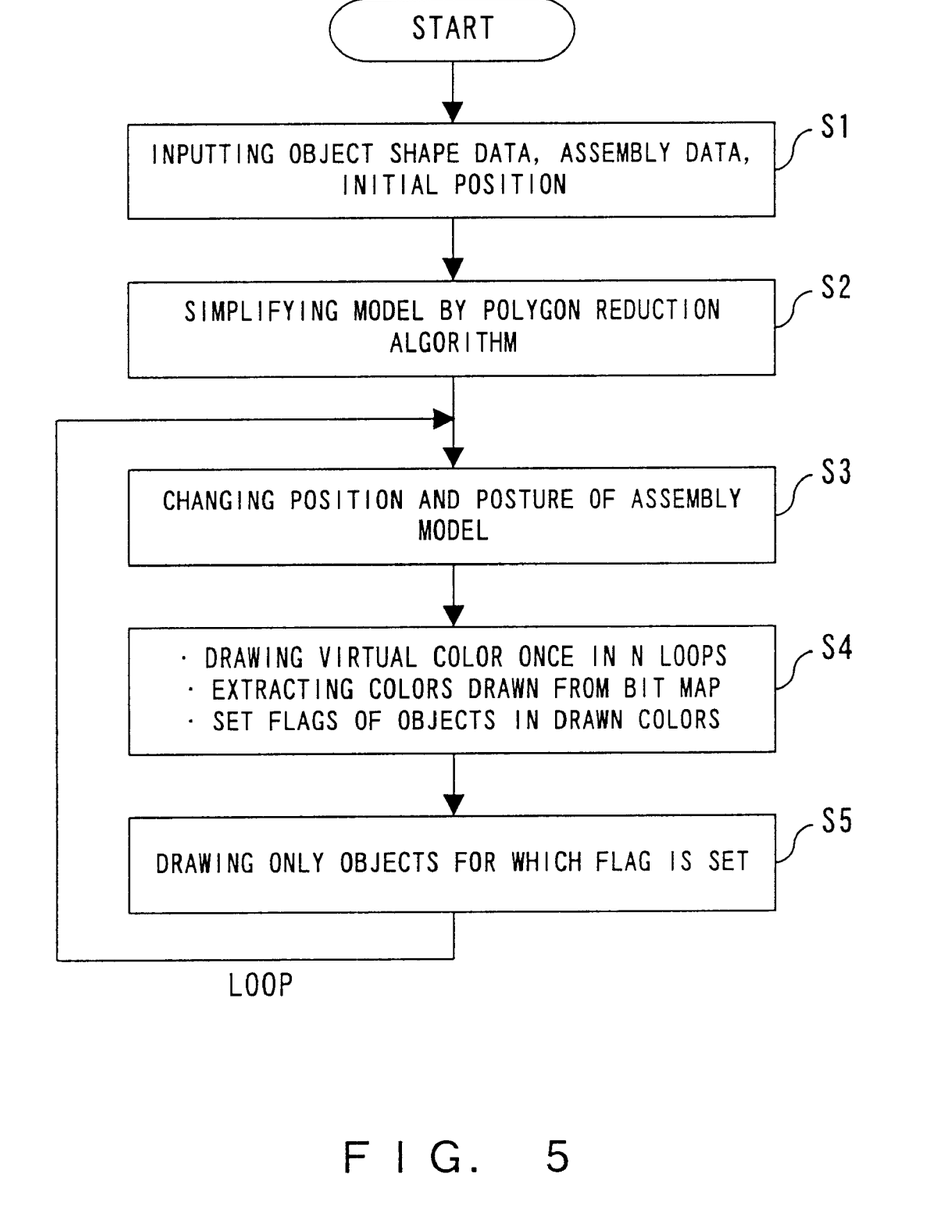
FIG. 5 is a flowchart of the first drawing process.

FIG. 5 is a flowchart of the drawing process performed by the drawing apparatus shown in FIG. 3. First, the CPU 23 reads to the shape data/assembly data memory 31 the shape data, assembly data, and initial position of the object contained in a displayed assembly model (step S1). Then, an arbitrary polygon reduction algorithm is applied to each of the read objects, and a model whose number of polygons has been reduced to the M stages in general is generated and stored in the polygon reduction memory 35 (step S2).

The polygon reduction algorithm can be, for example, an algorithm using a quadric error metric (Michael Garland and Paul S. Heckbert, 'Surface Simplification Using Quadric Error Metrics,' Proceedings of SIGGRAPH 1997, pp.209–216, 1997.)

Figure 6:
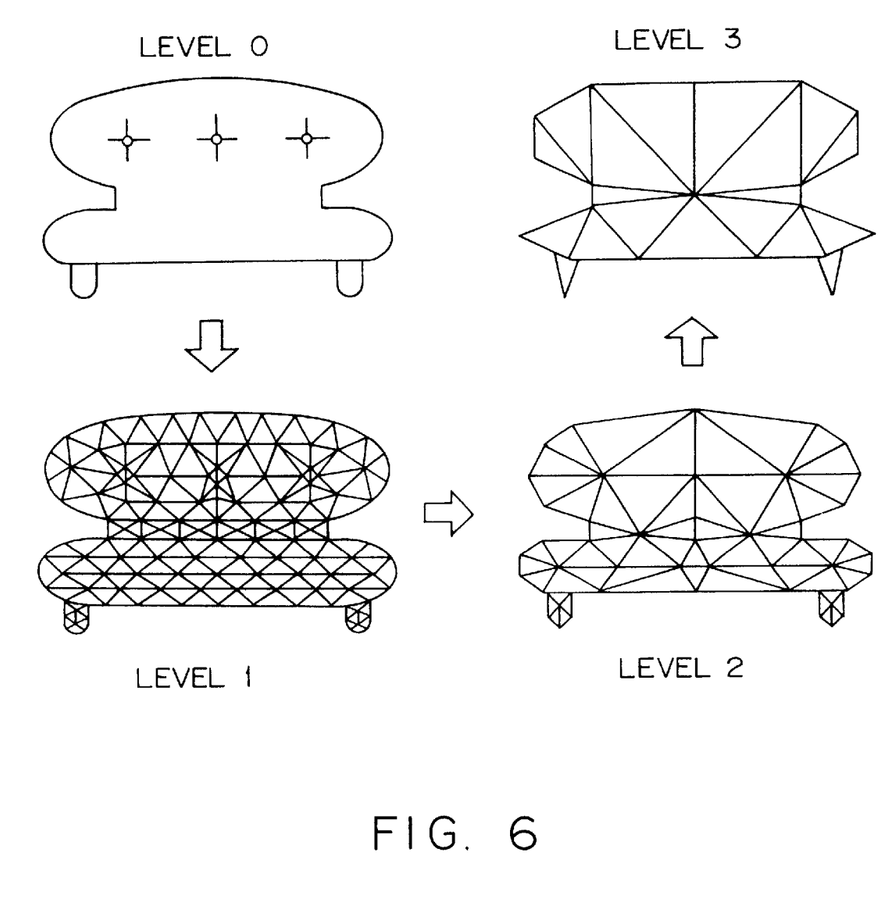
FIG. 6 shows polygon reduction.

FIG. 6 shows an example of reducing the shape model of an object (sofa) having several thousand of initial polygons into four stages. In this example, the model at the level of detail (LOD) of 0 corresponds to the original object. With a lower level from 1 to 3, the number of polygons decreases.

Then, according to the move instruction data input from the data input device 21, the CPU 23 changes the position and the posture of the read object by an infinitesimal amount, and stores the changed shape data in the coordinate transformation data memory 32 (step S3). When the user specifies the movement of the object, the move instruction data is input by interactively moving the object using an input device such as a mouse, etc. In addition, when the system automatically generates the movement of an object, the move instruction data is generated by a predetermined algorithm.

Then, using a frame buffer in the graphics processing device 25, each object is drawn in a different virtual color, and a bit map corresponding to a display screen is generated (step S4). Next, the generated bit map is read to the virtual color information memory 33, the bit map is scanned to extract the colors in which the objects are drawn. Then, by referring to the array table memory 36, the objects corresponding to the extracted colors are recognized, and the flags of the objects are set in the occlusion culling memory 34.

Figure 7:
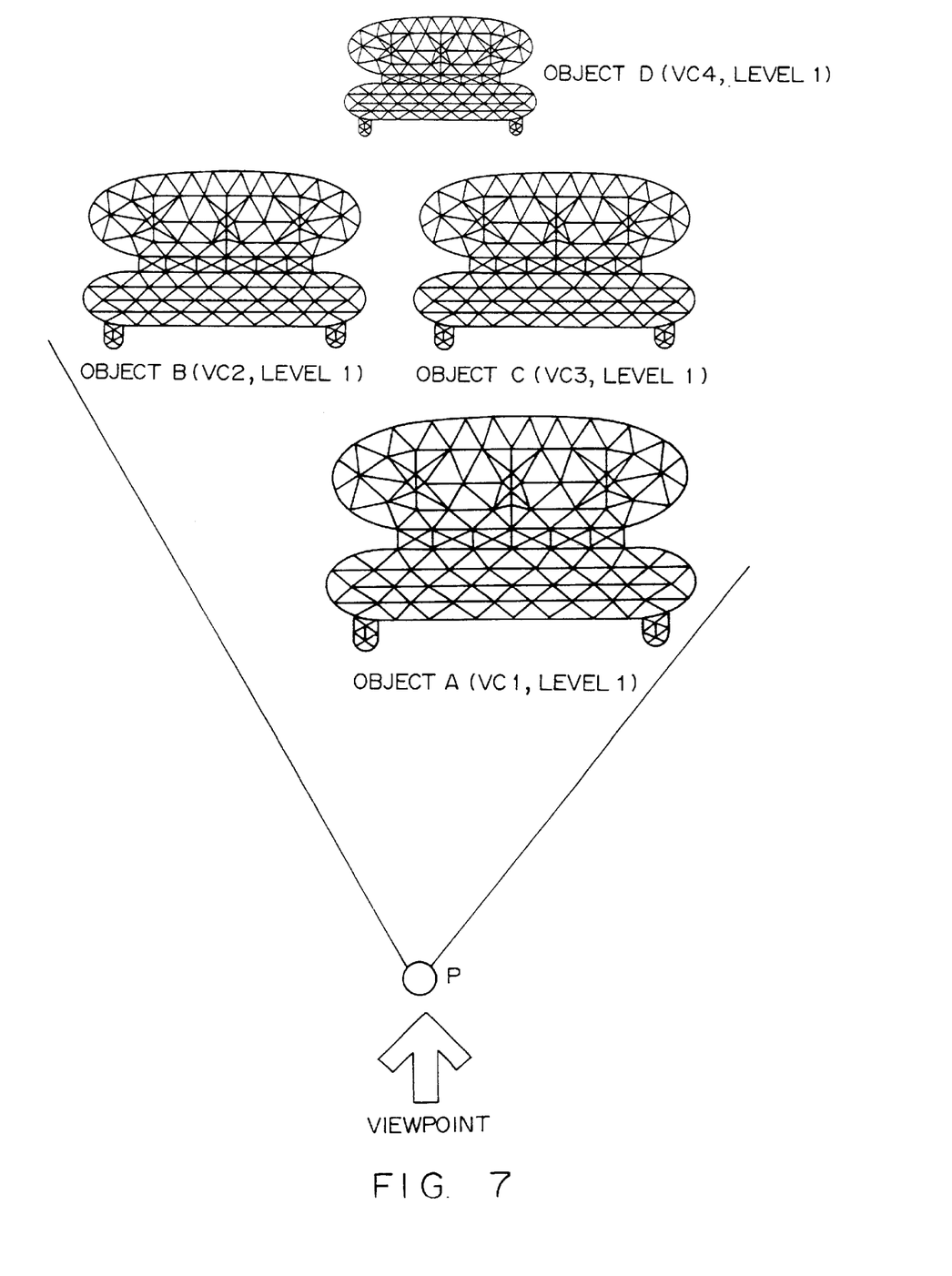
FIG. 7 shows an occlusion culling process.

FIG. 7 shows an example of the occlusion culling discrimination. In FIG. 7, different virtual colors VC1, VC2, VC3, and VC4 are assigned respectively to four objects A, B, C, and D at LOD level 1. Assume that the state of the objects viewed in the arrow direction from the viewpoint P is drawn in the frame buffer.

At this time, the objects viewed from the viewpoint P is only the object A and a part of the object B (left half of the sofa). The objects C and D are hidden behind other objects, and do not appear in the frame buffer. Therefore, two virtual colors VC1 and VC2 and the background color are extracted from the generated bit map.

If the background color is constantly white, and this color is not assigned as a virtual color of any object, then there is one-to-one correspondence between an object and its virtual color. Therefore, in this case, it is determined that only the two objects A and B can be viewed and the two objects C and D are occluded by other objects. Thus, the CPU 23 sets flags for the objects A and B, and resets the flags for the objects C and D.

Next, the CPU 23 extracts objects for which flags are set in the occlusion culling memory 34, and the graphics processing device 25 draws the objects in the original colors in the frame buffer, and displayed on the graphic display 26 (step S5). Then, the drawing apparatus displays the state in which an assembly model dynamically changes by repeating the loop process in steps S3 through S5.

The virtual color in the frame buffer used in the occlusion culling discrimination is deleted when the discrimination is completed, and is not displayed on the display unit. Actually displayed on the display unit are only the objects discriminated as being positioned in front.

Figure 8:
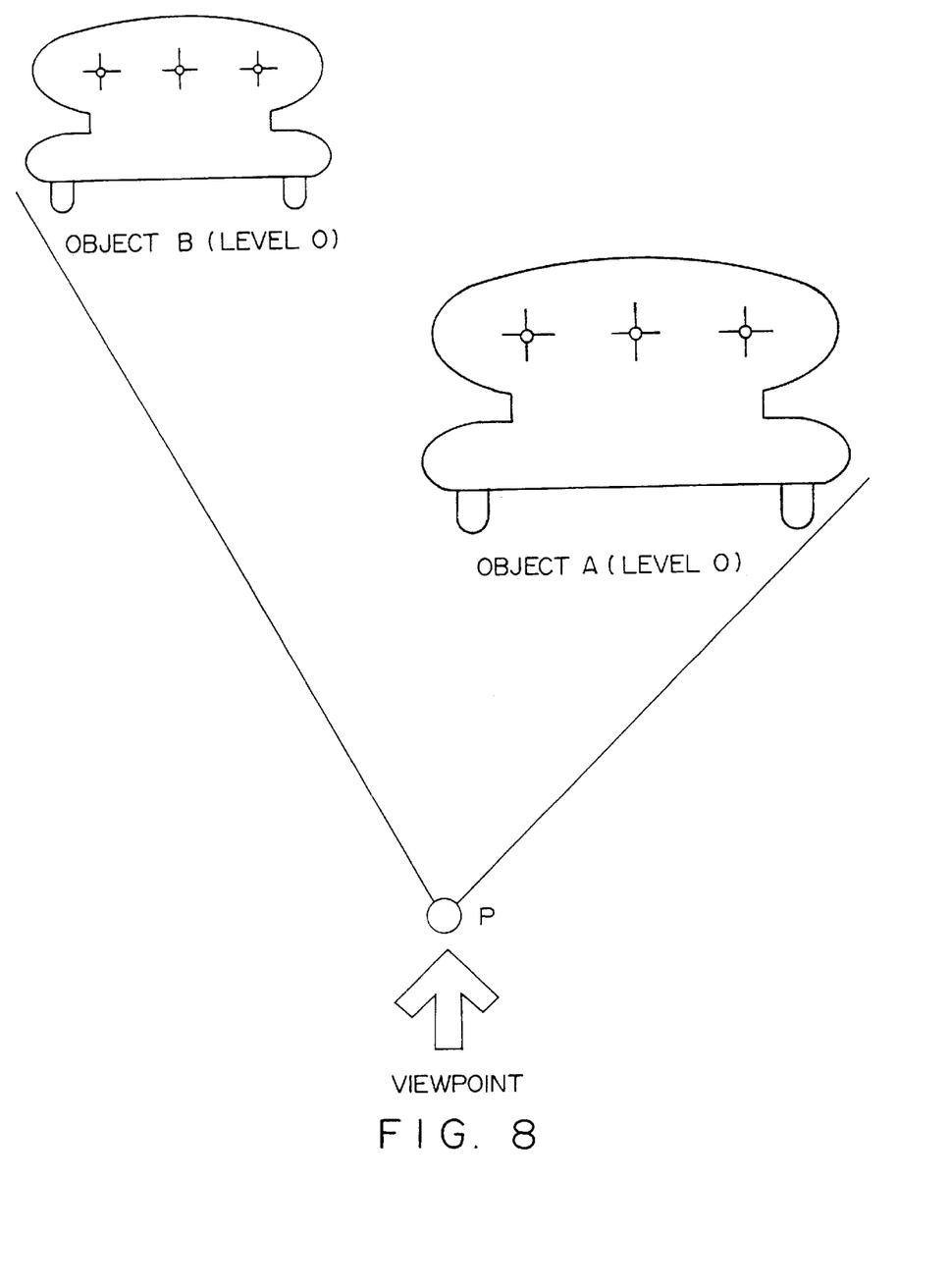
FIG. 8 shows a drawing after the occlusion culling process.

For example, FIG. 8 shows the drawing state at the next moment to the occlusion culling discrimination as shown in FIG. 7. In FIG. 8, only the objects A and B are drawn at level 0 corresponding to the initial number of polygons.

Figure 9:
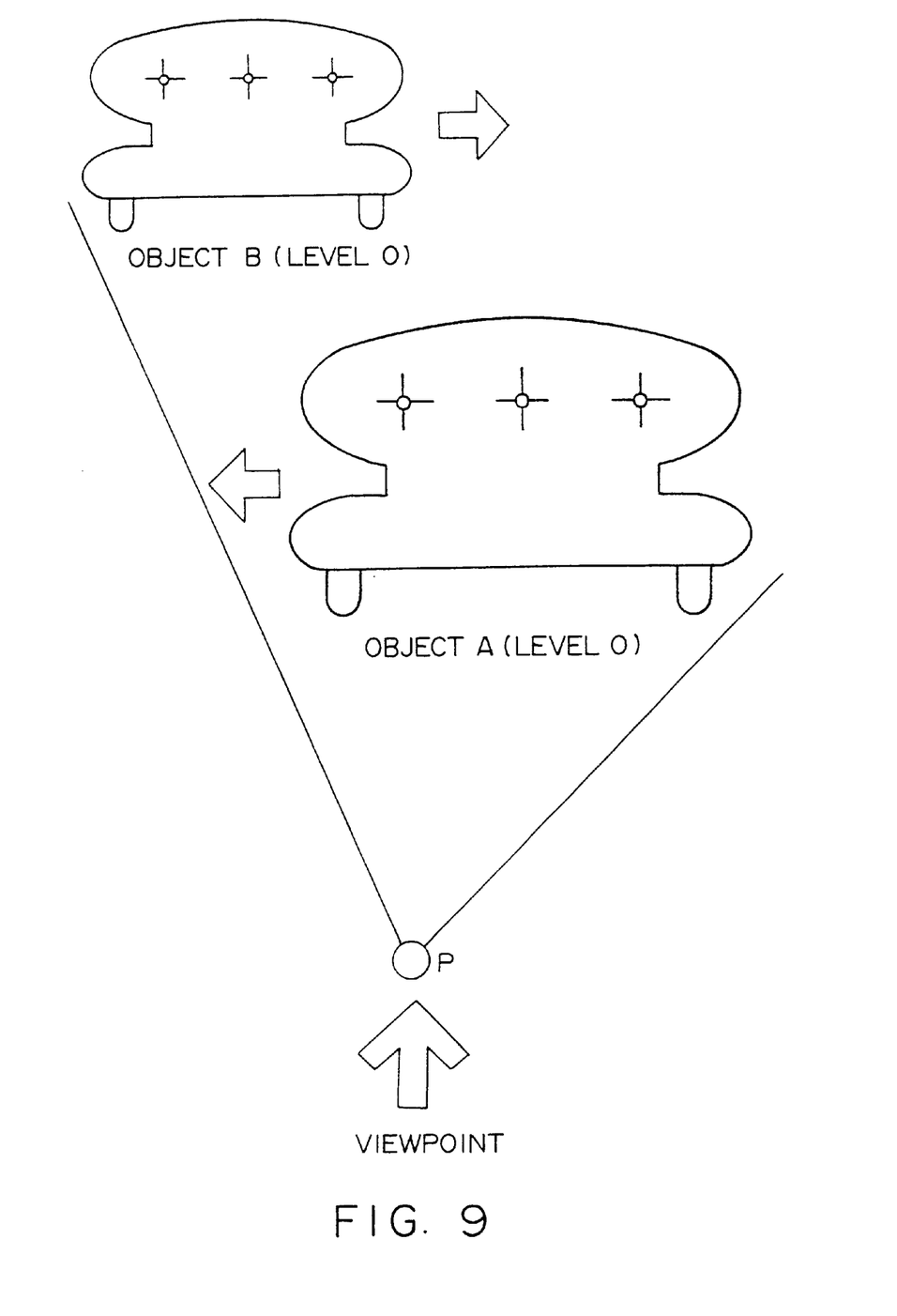
FIG. 9 shows the movement of an object.

Next, when each object moves by an infinitesimal amount, the drawing state changes as shown in FIG. 9. In FIG. 9, since the objects C and D are still occluded, it is not necessary to draw them. Therefore, only the objects A and B, which have been discriminated as being positioned in front in FIG. 7, are drawn.

Thus, the result of the occlusion culling discrimination is assumed to be true for several cycles if the amount of the movement of an object is infinitesimal. Then, the occlusion culling discrimination in step S4 shown in FIG. 5 is performed once in N loops with a given positive integer as N. In this case, since the drawing in a virtual color can be performed once in N loops, the process can be more efficiently performed than in the case where the drawing is performed every loop.

In the drawing in a virtual color shown in FIG. 7, the LOD (level 1) is set lower than the actual LOD (level 0) shown in FIGS. 8 and 9 because the drawing in a virtual color is performed only to make occlusion culling discrimination and therefore it is not necessary to perform the drawing using detailed polygons at level 0. This is the feature of this embodiment.

Then, the drawing apparatus performs its operation with the polygon reduction merged with the occlusion culling as described above. As a result, the occlusion culling discrimination can be made at a higher speed, and the entire object drawing speed can be increased.

In FIGS. 7, 8, and 9, each sofa is processed as one object. If one sofa comprises a plurality of parts, then each part is processed as one object and the similar occlusion culling process is performed.

Figure 10:
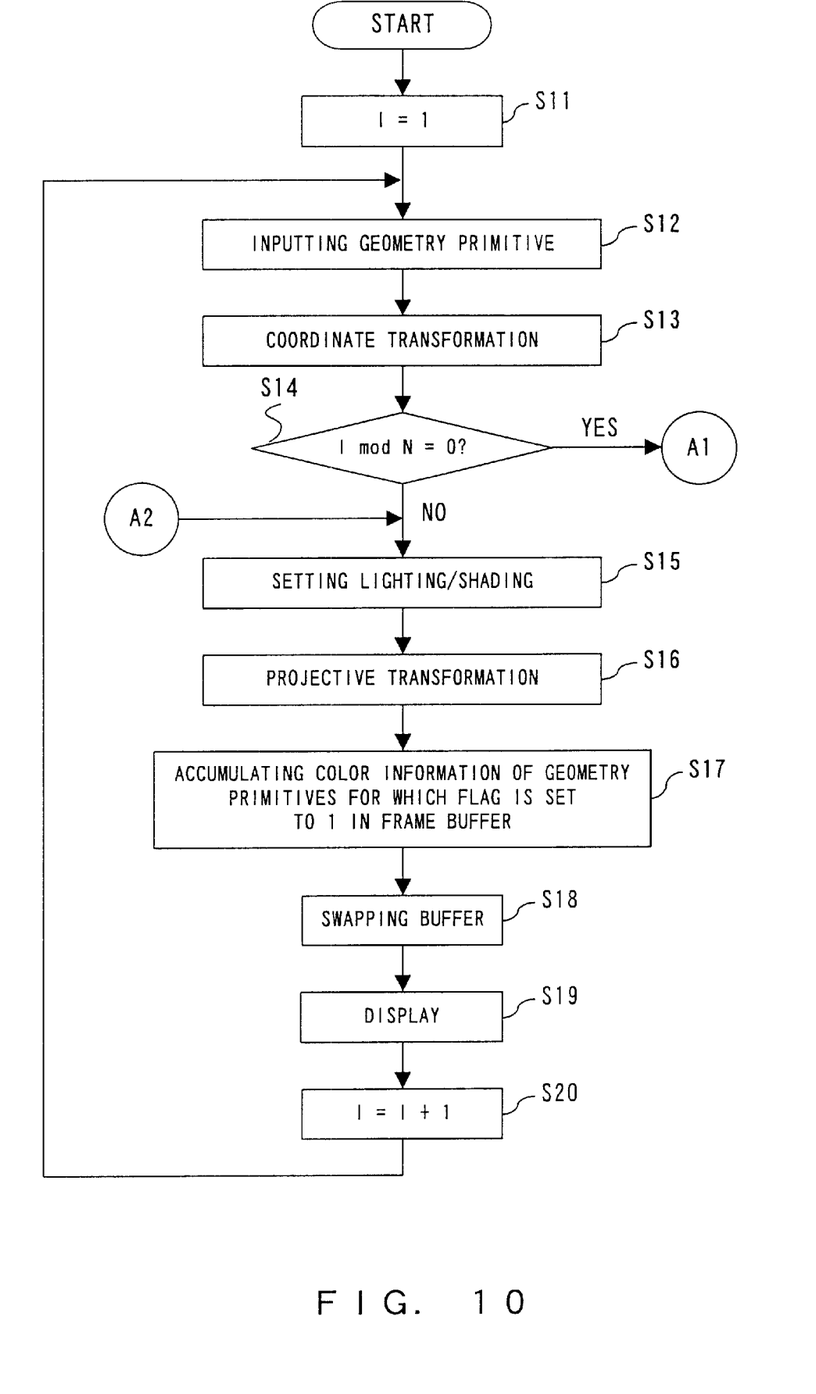
FIG. 10 is a flowchart (1) of the second drawing process.
Figure 11:
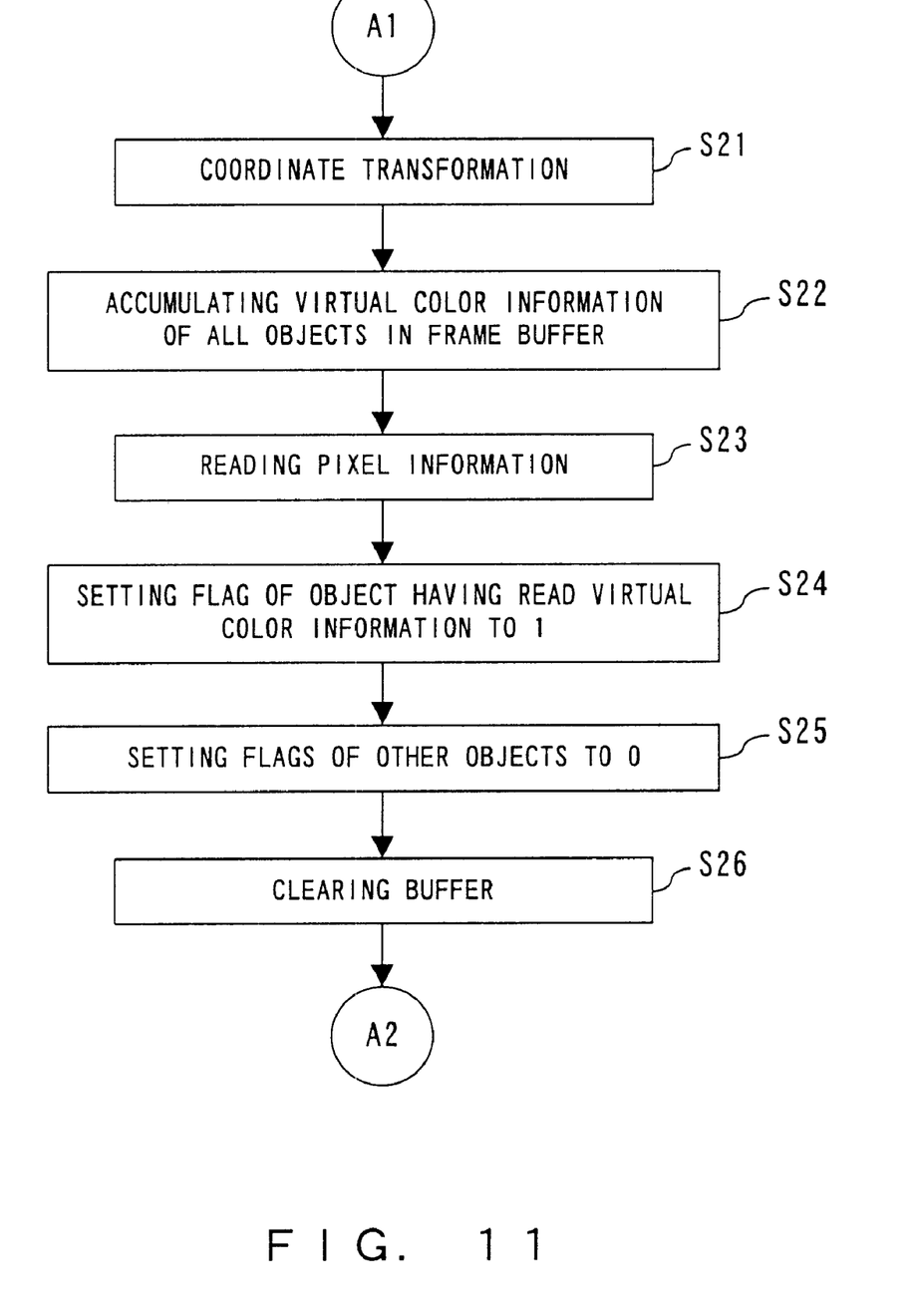
FIG. 11 is a flowchart (2) of the second drawing process.

FIGS. 10 and 11 are a detailed flowchart of the drawing process performed by the drawing apparatus shown in FIG. 3. In this example, the graphics processing device 25 draws an object using a double buffer as a frame buffer.

First, the CPU 23 substitutes 1 for a control variable I indicating the number of loops (step S11 shown in FIG. 10), and inputs the data of geometry primitives forming each object in the shape data/assembly data memory 31 (step S12).

Next, a coordinate transformation of each vertex of the geometry primitives is perfomed. Coordinate values are computed based on the absolute coordinate system, and the result is stored in the coordinate transformation data memory 32 (step S13). Then, in step S14 through S20, a loop process of a normal true-color display is performed. At the rate of once in N iterations, the virtual-color display shown in FIG. 11 is performed.

In this example, a remainder is first obtained by dividing I by N, and it is checked whether or not it is 0 (step S14). If the remainder is 0, then a projective transformation, that is, an orthographic or a perspective transformation, is performed (step S21 shown in FIG. 11). The virtual color information of each object is accumulated in the frame buffer (step S22). Thus, the virtual color of each geometry primitive is accumulated with pixel information in the frame buffer.

At this time, the graphics processing device 25 displays the screen as an xy plane, expresses the depth direction by z axis, and discriminates the front/back position of points overlapping in the z direction (points having equal xy coordinates). This discrimination is well-known in the drawing process using an existing graphics library, and is normally performed by hardware at a high speed. The color of the point in the forefront is stored as the color of the corresponding pixel.

The virtual-color display is usually performed using a model set at a low LOD level, and no special shading process is performed. Therefore, the drawing is performed in a so-called allover daubing manner.

In the pre-process of the drawing process, a combination of three integers each of which is an rgb value (each value is represented by an integer of 0 through 255) is assigned to each object as virtual color identification information in a dictionary order. Thus, the maximum 16,777,216 (=256× 256×256) virtual colors can be assigned to objects. The correspondence between the virtual color identification information and an object is stored in the array table memory 36.

Then, the CPU 23 reads the virtual color information of each pixel of a frame buffer to the virtual color information memory 33 (step S23), scans the pixels in the virtual color information memory 33, and extracts the virtual color identification information appearing on the pixels. Then, by referring to the array table memory 36 according to the identification information, the flag of an object having the virtual color is set to "1" in the occlusion culling memory 34 (step S24). In addition, the flags of other objects are set to "0" (step S25).

Then, the frame buffer to which the virtual color information is written is completely cleared, and then the swapping of two buffers is skipped (step S26). Therefore, an image in a virtual color is not displayed, and an image drawn in the previous loop remains as is.

Next, lighting/shading is set (step S15 shown in FIG. 10), and a projective transformation, that is, an orthographic or a perspective transformation, is performed (step S16). Then, a flag of each object is examined, and the true color and pixel information of a geometry primitive are accumulated only for an object having the flag value of "1" (step S17).

The graphics processing device 25 swaps two buffers (step S18), and the accumulated information is displayed on the screen (step S19). In this true-color drawing, a model having a higher LOD level than in the virtual-color drawing in step S22 is used.

Next, based on I=I+1, the processes in and after step S12 are repeated. Thus, the occlusion culling discrimination is made each time N frames are displayed, and the subsequent N frames are displayed based on the discrimination result.

Described below is the standard for the polygon reduction in which the number of polygons of a model used in the drawing in steps S17 and S24 is determined. As a basic algorithm of the polygon reduction, for example, the above described quadric error metrics algorithm can be used.

At this time, it is desired that the number of polygons of each object is reduced while maintaining the shape of the entire assembly model, and the total number of polygons of the assembly model can be effectively reduced. For example, the assembly model B0 shown in FIG. 12 comprises objects B1, B2, B3, B4, B5, and B6, thereby requesting efficient reduction of the number of polygons of the assembly model B0.

Figure 12:
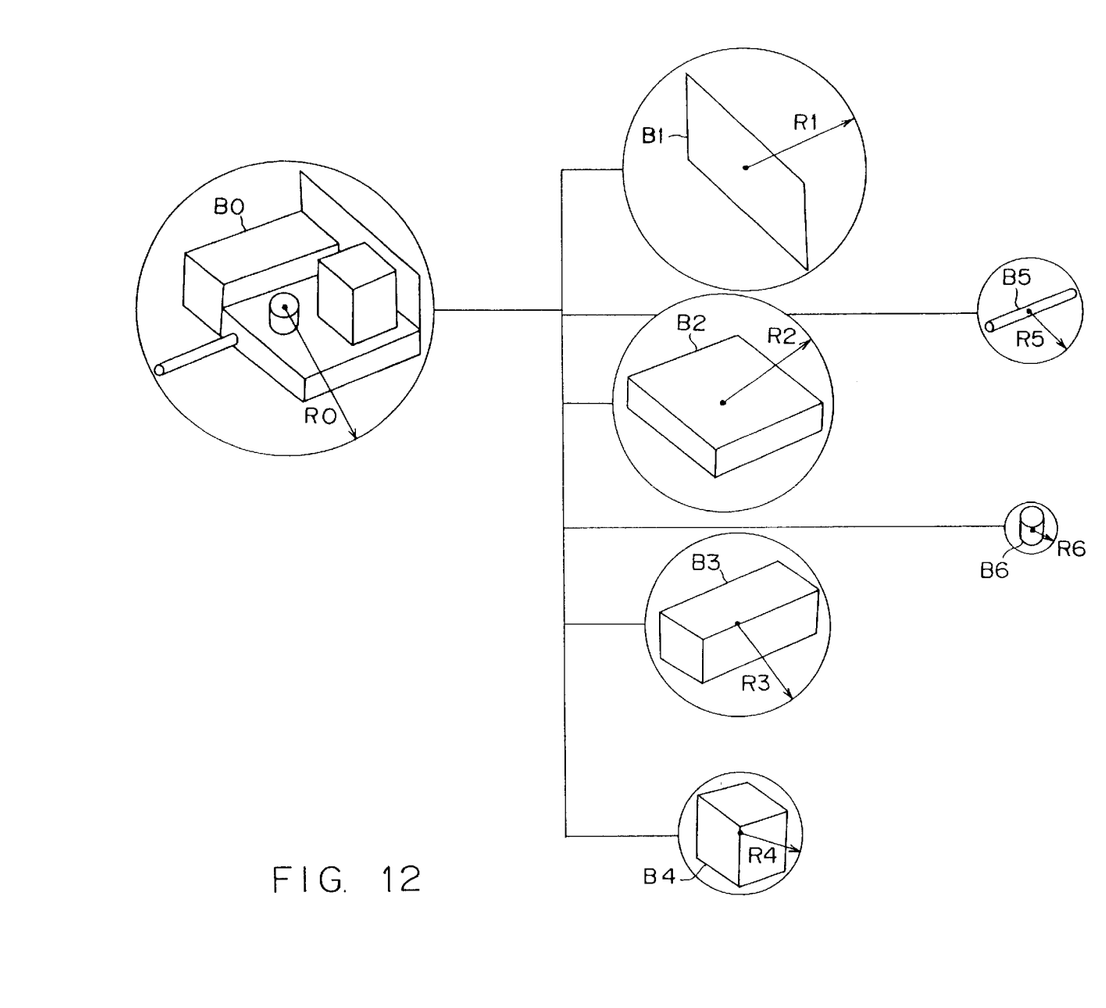
FIG. 12 shows spheres including an object.

Then, in FIG. 12, assuming that the initial number of polygons of each object Bi (i=1, . . . , 6) is Pi, the radius of a sphere containing the object Bi is Ri, and the radius of the sphere containing the assembly model B0 is R0, the target reduced number of polygons Qi is determined by the following equation.

$$Qi = \alpha \times Pi \times (Ri/R0) \quad (1)$$

where a is a real number parameter satisfying $0 \leq \alpha \leq 1$, and is set smaller as the LOD becomes lower. By the equation (1), the target number Qi of polygons is determined based on the ratio of the radius of the sphere containing the object Bi to the radius of the sphere containing the assembly model B0. That is, the target number Qi of polygons is determined based on the ratio of the size of the object Bi to the size of the assembly model B0.

Therefore, by computing the number of polygons with the equation (1), the number of polygons of an object relatively small and inconspicuous in the assembly model can be reduced more than the number of polygons of other objects. Since the change in the number of polygons of such an object does not much affect the entire shape, the shape of the assembly model is not largely changed and the number of polygons is effectively reduced.

For example, an object such as a screw, a bolt, etc. can be formed of a large number of polygons for their size. When an assembly model contains an object of such parts, the number of polygons of these parts can be effectively reduced by performing the polygon reduction using the equation (1), thereby speeding up the process.

Thus, the information about each object whose number of polygons has been reduced for each LOD is stored in the polygon reduction memory 35, and used when an object is drawn in the frame buffer.

Assume that the LOD of the original assembly model before the polygon reduction is level 0, and that the LOD of the assembly model whose number of polygons has been reduced by substituting $\alpha=1.0$ in the equation (1) is level 1. At this time, if the true-color drawing in step S17 shown in FIG. 10 is performed at level 0, and the virtual-color drawing in step S24 shown in FIG. 11 is performed at level 1, then the occlusion culling can be quickly performed, thereby efficiently performing the 3D drawing.

To be more common, a plurality of values are prepared for a in the equation (1) to set the LOD at multiple stages. For example, in the case that the 3-stage LOD of levels 0, I, and J ($0 < I < J$) are set, when an assembly model is interactively moved, the true-color drawing is performed at level I and the virtual-color drawing is performed at level J. When an assembly model is inactive, the true-color drawing is performed at level 0.

In the equation (1), the target number of polygons is determined by the ratio between radii of the containing spheres. The ratio between the radii can be replaced with the ratio between the surface areas or volumes between the containing spheres when determining the target number of polygons. Furthermore, the containing spheres can be replaced with other figures such as cubes, rectangular parallelepipeds, etc. containing the objects and the assembly model, and the target number of polygons is determined based on the ratio between them.

In addition, when there is an index indicating the size of an object and an assembly model, the target number of polygons can be determined based on the indexes. When an object comprises other geometry primitives, the target number of geometry primitives can be similarly obtained.

According to the above described embodiment, the process of drawing an assembly model is performed by a mechanical CAD, but the occlusion culling process can be similarly performed in other 3DCG fields such as graphics games, animation, walk-through, etc.

In the occlusion culling discrimination, instead of drawing an object in a virtual color, each object can be assigned unique identification information, and a bit map can be generated by drawing an object with the identification information. In this case, it can be determined whether or not an object is occluded by another object by scanning the identification information in the bit map as in the case of the virtual-color.

According to the present invention, correct and high-speed occlusion culling can be performed in the 3DCG system because the occlusion culling discrimination can be performed in the bit map using the shape of an object itself. As a result, it is expected that the quality of 3DGC can be effectively improved.

What is claimed is:

1. A drawing apparatus displaying a plurality of objects, comprising:

a shape information storage unit storing shape information about the plurality of objects;

a table unit storing plural pieces of virtual color information one-to-one virtually corresponding to the plurality of objects and different from actual color information used for actually displaying the objects;

a virtual image storage unit storing virtual color image information generated on a bit map based on information in said shape information storage unit and said table unit, the virtual color image information being generated by selecting a point in forefront from among a plurality of points overlapping in a depth direction of a screen and accumulating virtual color information of the selected point for respective pixels of the screen on the bit map, and the generated virtual color image information not being displayed on the screen;

a discrimination unit making occlusion discrimination which determines whether an object is occluded by another object, by scanning the pixels of said virtual color image information on the bit map, said discrimination unit extracting the virtual color information on the pixels, referring to said table unit, determining that an object corresponding to the extracted virtual color information among the plurality of objects is an object not occluded by another object, and determining that an object corresponding to unextracted virtual color information among the plurality of objects is an occluded object occluded by another object;

an occlusion culling unit omitting to display the occluded object discriminated as being occluded among the plurality of objects; and a display unit accumulating actual color information of respective pixels of the object not occluded and displaying the accumulated actual color information on the screen.

2. The apparatus according to claim 1, wherein said occlusion culling unit includes a flag unit distinguishing the occluded object from the object not occluded.

3. The apparatus according to claim 1, further comprising a reduction unit reducing a number of geometry primitives forming the plurality of objects, wherein said virtual color image information is generated using an object whose number of geometry primitives is reduced.

4. The apparatus according to claim 3, wherein
said reduction unit determines the number of geometry primitives based on a size of each object.

5. The apparatus according to claim 3, wherein
said virtual image storage unit stores virtual color image information generated each time a predetermined number of frames are displayed; and said discrimination unit makes said occlusion discrimination each time the virtual color image information is stored.

6. The apparatus according to claim 1, wherein
said virtual image storage unit stores virtual color image information generated each time a predetermined number of frames are displayed; and said discrimination unit makes said occlusion discrimination each time the virtual color image information is stored.

7. The apparatus according to claim 1, said displaying unit including a buffer unit accumulating the actual color information of the object not occluded for each frame, wherein said display unit displays the actual color information accumulated in said buffer unit.

8. A drawing apparatus displaying a plurality of objects, comprising:

a shape information storage unit storing shape information about the plurality of objects;

a table unit storing plural pieces of virtual identification information one-to-one corresponding to the plurality of objects and different from actual color information used for actually displaying the objects;

a virtual image storage unit storing virtual image information generated on a bit map based on information in said shape information storage unit and said table unit, the virtual image information being generated by selecting a point in forefront from among a plurality of points overlapping in a depth direction of a screen and accumulating virtual identification information of the selected point for respective pixels of the screen on the bit map, and the generated virtual image information not being displayed on the screen;

a discrimination unit making occlusion discrimination which determines whether an object is occluded by another object, by scanning the pixels of said virtual image information on the bit map, said discrimination unit extracting the virtual identification information on the pixels, referring to said table unit, determining that an object corresponding to the extracted virtual identification information among the plurality of objects is an object not occluded by another object, and determining that an object corresponding to unextracted virtual identification information among the plurality of objects is an occluded object occluded by another object;

an occlusion culling unit omitting to display the occluded object discriminated as being occluded among the plurality of objects, and a display unit accumulating actual color information of respective pixels of the object not occluded and displaying the accumulated actual color information on the screen.

9. A computer-readable storage medium storing a program to direct a computer displaying a plurality of objects to perform:

generating virtual color image information on a bit map based on shape information about the plurality of objects and plural pieces of virtual color information one-to-one virtually corresponding to the plurality of objects, the virtual color information being different from actual color information used for actually displaying the objects, the virtual color image information being generated by selecting a point in forefront from among a plurality of points overlapping in a depth direction of a screen and accumulating virtual color information of the selected point for respective pixels of the screen on the bit map, and the generated virtual color image information not being displayed on the screen;

making occlusion discrimination to determine whether an object is occluded by another object, by scanning the pixels of the virtual color image information on the bit map, said occlusion discrimination extracting the virtual color information on the pixels, and determining that an object corresponding to the extracted virtual color information among the plurality of objects is an object not occluded by another object, and determining that an object corresponding to unextracted virtual color information among the plurality of objects is an occluded object occluded by another object; and omitting to display the occluded object discriminated as being occluded among the plurality of objects; and accumulating actual color information of respective pixels of the object not occluded and displaying the accumulated actual color information on the screen.

10. A method for drawing and displaying a plurality of objects, comprising:

generating virtual color image information on a bit map based on shape information about the plurality of objects and plural pieces of virtual color information one-to-one virtually corresponding to the plurality of objects, the virtual color information being different from actual color information used for actually displaying the objects, the virtual color image information being generated by selecting a point in forefront from among a plurality of points overlapping in a depth direction of a screen and accumulating virtual color information of the selected point for respective pixels of the screen on the bit map, and the generated virtual color image information not being displayed on the screen;

making occlusion discrimination to determine whether an object is occluded by another object, by scanning the pixels of the virtual color image information on the bit map, said occlusion discrimination extracting the virtual color information on the pixels, and determining that an object corresponding to the extracted virtual color information among the plurality of objects is an object not occluded by another object, and determining that an object corresponding to unextracted virtual color information among the plurality of objects is an occluded object occluded by another object;

omitting to display the occluded object discriminated as being occluded among the plurality of objects; and accumulating actual color information of respective pixels of the object not occluded and displaying the accumulated actual color information on the screen.

11. A drawing apparatus displaying a plurality of objects which form a three-dimensional graphics model, comprising:

a reduction unit determining a target number of geometry primitives forming each of the plurality of objects according to a ratio of a radius of a sphere containing each object to a radius of a sphere containing the three-dimensional graphics model, and reducing a number of geometry primitives of each object to the target number;

a discrimination unit making occlusion discrimination which determines whether an object is occluded by another object, using the objects, each of which has a reduced number of geometry primitives; and a display unit displaying an object discriminated as not being occluded by another object among the plurality of objects using geometry primitives larger in number than the geometry primitives used in said occlusion discrimination.

12. A method for drawing and displaying a plurality of objects, comprising:

generating virtual color image information on a bit map based on shape information, the virtual color information being different from actual color information used for actually displaying the objects and generated by selecting a point in forefront from among a plurality of points overlapping in a depth direction of a screen, accumulating virtual color information of the selected point for respective pixels of the screen on the bit map, and the generated virtual color image information not being displayed on the screen;

discriminating to determine whether an object is occluded by another object, said occlusion discrimination extracting the virtual color information on the pixels, determining that an object corresponding to the extracted virtual color information among the plurality of objects is an object not occluded by another object, and determining that an object corresponding to unextracted virtual color information among the plurality of objects is occluded by another object;

omitting display of the discriminated occluded object;

accumulating actual color information of respective pixels of the object not occluded; and displaying the accumulated actual color information on the screen.

* * * * *